United States Patent [19]
Harger et al.

[11] Patent Number: 5,528,956
[45] Date of Patent: Jun. 25, 1996

[54] VEHICULAR PARKING BRAKE CONTROL WITH STORED ENERGY ASSIST FOR APPLYING THE BRAKE

[75] Inventors: James R. Harger, Rockford; LaVern R. McCallips, Roscoe, both of Ill.

[73] Assignee: Atwood Industries, Inc., Rockford, Ill.

[21] Appl. No.: 336,176

[22] Filed: Nov. 8, 1994

[51] Int. Cl.⁶ ........................................... G05G 1/14
[52] U.S. Cl. ........................ 74/517; 74/529; 74/540; 74/97.1
[58] Field of Search .................. 74/517, 529, 540, 74/97.1

[56] References Cited

U.S. PATENT DOCUMENTS

| | | | |
|---|---|---|---|
| 3,316,776 | 5/1967 | Schroter | 74/97.1 X |
| 3,839,924 | 10/1974 | Schaefer | 74/517 X |
| 4,290,507 | 9/1981 | Brown | 74/97.1 X |
| 4,614,130 | 9/1986 | Heismann et al. | 74/97.1 X |
| 4,949,592 | 8/1990 | Yamazaki et al. | 74/540 X |
| 5,215,176 | 6/1993 | Hamann | 74/97.1 X |

*Primary Examiner*—Richard M. Lorence
*Assistant Examiner*—Mary Ann Battista
*Attorney, Agent, or Firm*—Leydig, Voit & Mayer, Ltd.

[57] ABSTRACT

A spring acts on an operating member of a parking brake control and, when the brake is released, not only reduces the flyback energy resulting from the release but also stores such energy for use as a power assist during the next application of the brake. The spring acts on the operating member through a cam which removes the spring force from the operating member when the brake is fully released while progressively amplifying the spring force as the brake is progressively applied.

8 Claims, 2 Drawing Sheets 5,528,956

1

VEHICULAR PARKING BRAKE CONTROL WITH STORED ENERGY ASSIST FOR APPLYING THE BRAKE

BACKGROUND OF THE INVENTION

This invention relates to apparatus for applying and releasing a vehicular parking brake. Typically such apparatus includes a control with a foot-operated lever or pedal which, when depressed, acts to turn a toothed member and apply tension to a cable in order to set the parking brake of the vehicle. Once the brake has been set, the toothed member is held in a fixed position in order to prevent the brake return springs and the brake shoe clamp load from effecting release of the brake. In some braking systems, the toothed member is held in its fixed position by a wrap spring clutch.

When the control is actuated to release the brake, the energy stored in the brake cable/shoe system accelerates the pedal rapidly and forcibly to its released position. Usually, a bumper is provided to stop the pedal and dissipate the flyback energy. In some cases, the energy is dissipated by a viscous damper. In any event, rapid flyback of the pedal is extreme in nature and is a problem which must be addressed in a parking brake control.

SUMMARY OF THE INVENTION

The general aim of the present invention is to provide a new and improved parking brake control in which the energy occurring as a result of pedal flyback not only is effectively reduced but also is stored and is used as a power-assist during the next application of the brake. In this way, the manual force required to set the brake is reduced and, as a result, the brake pedal can be shortened and/or the angle through which the pedal travels may be reduced so as to require less space for the pedal in the vehicle and to reduce pedal encumbrance while entering and exiting the vehicle.

Another object of the invention is to provide, in a parking brake which uses a wrap spring clutch, a means of lowering the torque requirements of the clutch.

A more detailed object is to achieve the foregoing by providing a parking brake control in which spring means are loaded during pedal flyback, the spring means absorbing the flyback energy and storing such energy for use in assisting to set the brake the next time the brake is applied. The force exerted by the spring means on the toothed member opposes the force exerted by the brake cable so as to reduce the force required to hold the toothed member in a fixed position and, in the case of a control with a wrap spring clutch, to reduce the demand placed on the clutch.

A further object of the invention is to progressively amplify the force exerted by the spring means as the spring means progressively unload during setting of the parking brake and to substantially remove the effect of the spring means on the control when the brake is fully released and the spring means are fully loaded.

These and other objects and advantages of the invention will become more apparent from the following detailed description when taken in conjunction with the accompanying drawings.

2

Figure 1:
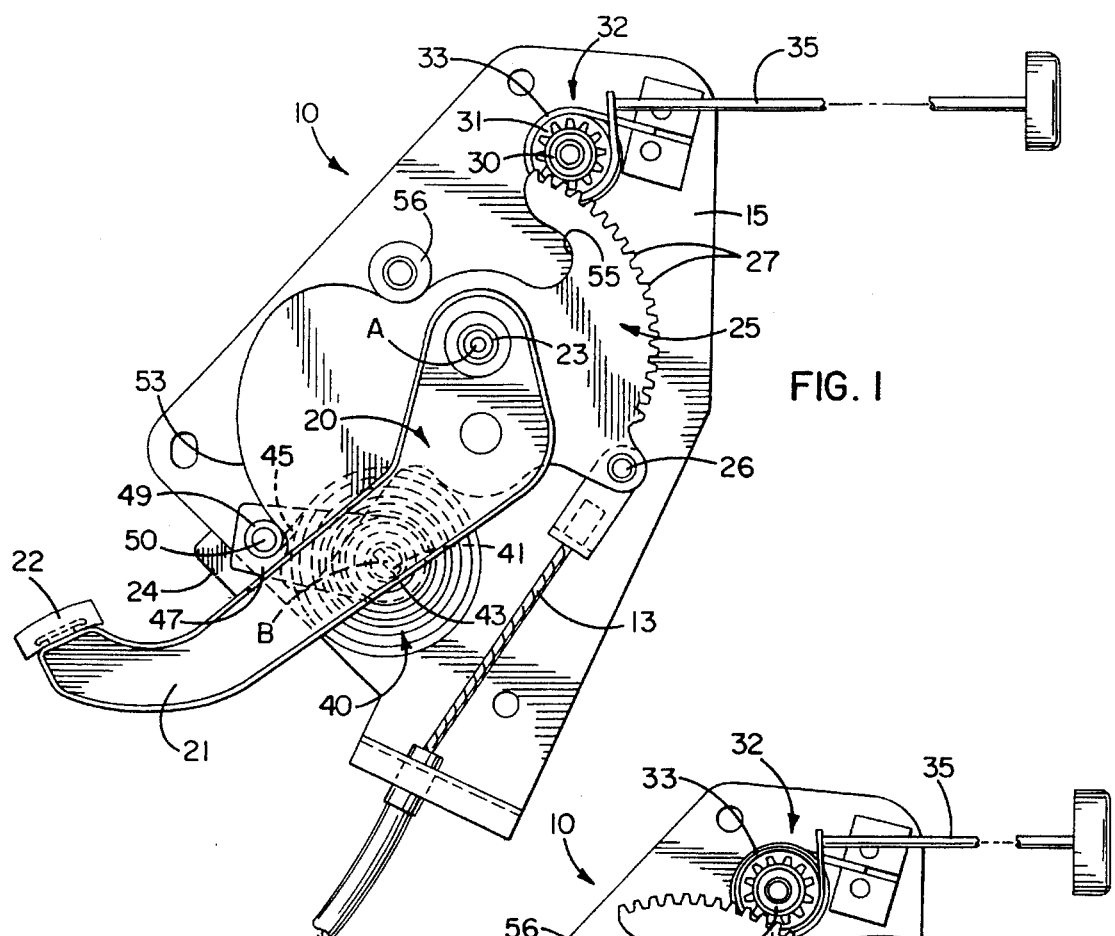
FIG. 1 is a side elevational view, in somewhat schematic form, of a new and improved parking brake control incorporating the unique features of the present invention, the control being shown in a full brake-released condition.
Figure 2:
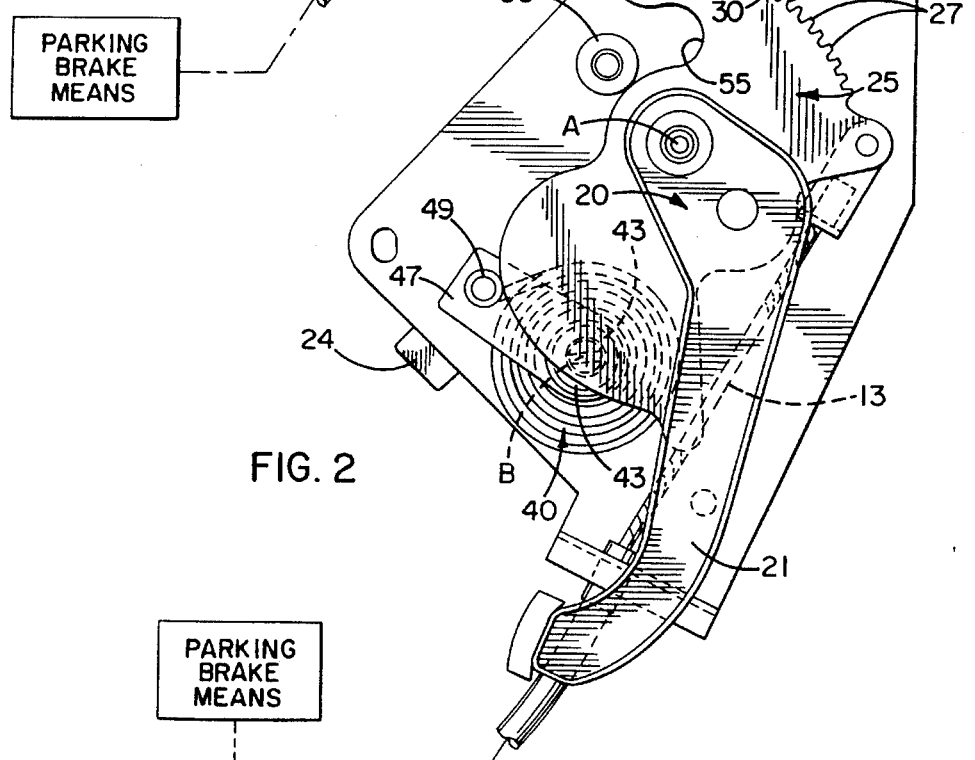

FIG. 2 is a view similar to FIG. 1 but shows the control in a partial brake-applied condition.

Figure 3:
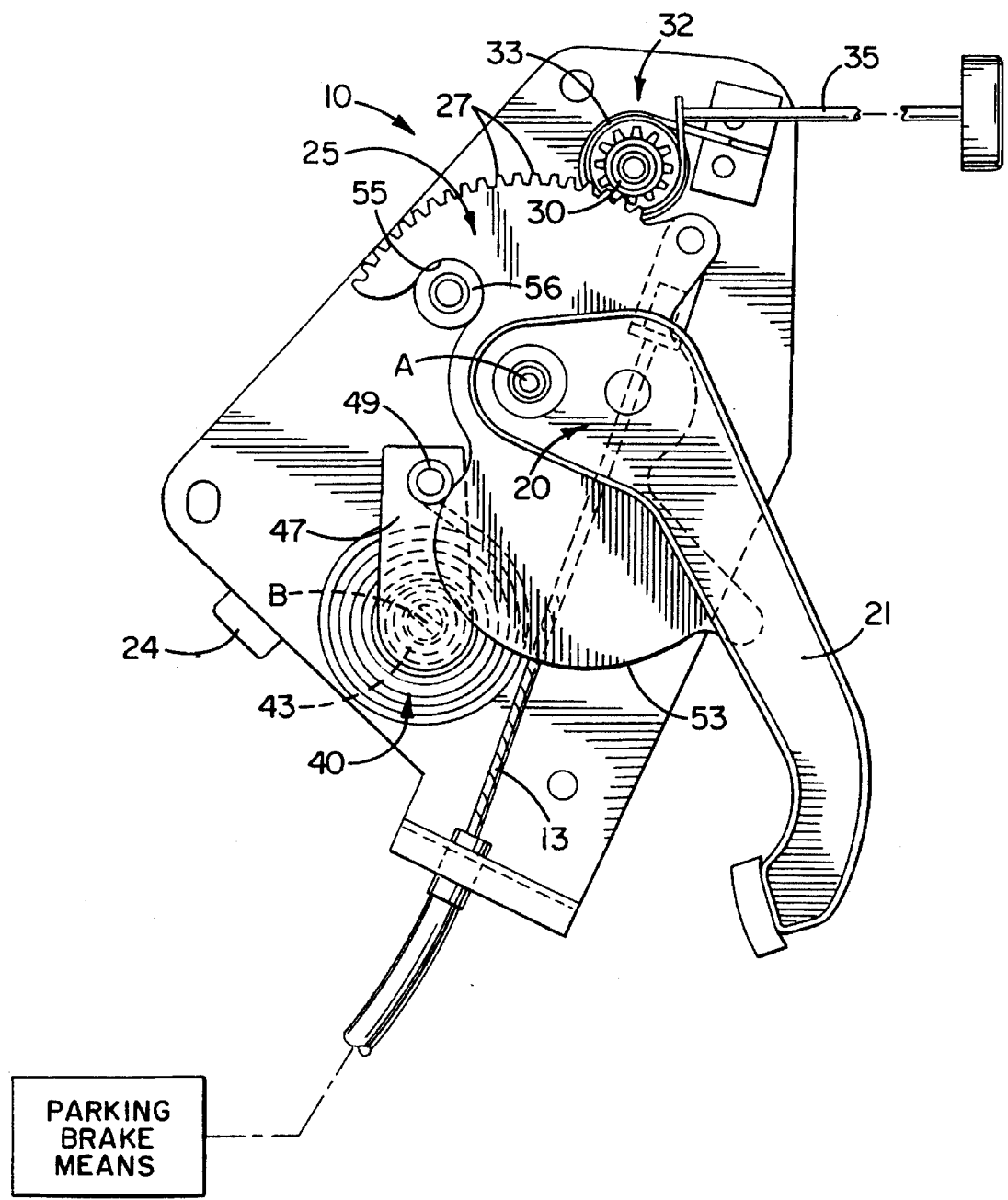

FIG. 3 also is a view similar to FIG. 1 but shows the control in a full brake-applied condition.

While the invention is susceptible of various modifications and alternative constructions, a certain illustrated embodiment hereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENT

For purposes of illustration, the invention has been shown in the drawings as incorporated in control apparatus 10 for setting and releasing the parking brake of an automobile or other vehicle. The parking brake itself has been shown schematically by the box in FIG. 1 and includes rear braking elements which are forced into engagement with drums or rotors when force is applied to the braking elements via a flexible cable 13 which is connected to the control 10. Return springs are associated with the braking elements and release the latter when the tensile force applied to the cable by the control is relieved.

The parking brake control 10 includes a main supporting bracket 15 which is adapted to be attached by fasteners to a fixed frame member beneath the instrument panel of the vehicle.

Setting of the parking brake is effected in response to counterclockwise pivoting of an operating member or actuating lever 20 which herein is in the form of a foot-operated pedal having an elongated arm 21 with a rubber pad 22 on the lower end thereof. A rivet 23 extends through the bracket 15 and the pedal 20 and supports the pedal to turn about a laterally extending horizontal axis A. When the pedal is in its full brake-release position (FIG. 1), the upper side of the arm engages and is stopped by a rubber bumper 24 on the bracket 15.

Attached to and rotatable in unison with the pedal 20 is a toothed member or sector 25 which is attached to the brake cable at 26 and which pulls on the cable to apply the brake when the pedal is turned counterclockwise from its brake-released position of FIG. 1 toward its brake-applied position of FIG. 3. One edge of the sector 25 is formed with a row of involute teeth 27 which coact with a pinion member or toothed wheel 30 rotatable with the output hub 31 of a one-way clutch 32. In this instance, the clutch is of the wrap spring type and includes a helical spring 33 which encircles the output hub. As the brake is applied, the spring 33 allows free clockwise rotation of the wheel 30 as the teeth 27 of the sector 25 interact with the teeth of the wheel. If the wheel, however, attempts to rotate in a counterclockwise direction, the spring 33 contracts tightly around the hub 31 and prevents such rotation. Accordingly, the clutch 32 is effective to hold the sector 25 in a fixed position once the brake is set and thereafter prevents the sector from turning clockwise toward its released position.

In order to release the parking brake, the wrap spring 33 is actuated in a direction causing the spring to unwind slightly from the hub 31 of the clutch 32. This may be effected by manually pulling a release rod 35 attached to one end of the wrap spring. Once the spring relaxes on the hub, the toothed wheel 30 is free to turn counterclockwise and allow the sector 25 and the pedal 20 to return in a clockwise direction to the brake-released position.

When the brake is released by actuating the rod 35, the sector 25 and the attached pedal 20 are forcibly turned clockwise about the axis A by the brake return springs acting through the cable. The energy stored in the cable/shoe system accelerates the pedal rapidly to its brake-released position until the pedal arm 21 hits the stop bumper 24. Unless provision is made to dissipate the flyback energy, the arm hits the bumper with significant force.

In accordance with the present invention, spring means 40 act on the pedal 20 to absorb the flyback energy and, at the same time, to store such energy so that the energy may be used to assist in moving the pedal to its brake-applied position the next time the brake is set. In this way, the manual effort to apply the brake may be significantly reduced and/or the pedal arm 21 may be shortened and/or the angular distance through which the pedal arm must travel to fully set the brake may be reduced. A shorter pedal arm occupies less space in the passenger compartment of the vehicle and presents less of an obstruction to the driver, particularly during entry into and exit from the vehicle. Swinging of the pedal arm through a shorter arc reduces the space required to accommodate the pedal arm.

More particularly, the specific spring means 40 which is used herein is a spiral spring having one end tang 41 anchored within a slot in a pin 43 which is fixed to the bracket 15. The other end tang 45 is fixed near the free end portion of a lever 47 which is rotatably supported on the pin 43 to turn about an axis B extending parallel to the axis A. The free end portion of the lever carries a cam follower 49 which herein is in the form of a roller supported to rotate about a pin 50 carried by the lever and extending parallel to the axis B. The spring 40 is wound in a direction to bias the roller 49 against a cam surface 53 which, in this particular instance, is formed on one edge of the sector 25.

The purpose of the cam surface 53 is to remove or substantially remove the force of the spring 40 from the sector 25 when the pedal 20 is in its full brake-released position and to progressively amplify the spring force as the pedal is progressively moved from its brake-released position toward its brake-applied position. To this end, the cam surface 53 is shaped such that the radial distance between the line of force acting on the cam surface and the axis A progressively increases as the sector 25 turns counterclockwise about the axis A from the brake-released position to the brake-applied position.

To explain the operation of the parking brake control 10, assume that the pedal 20 has been depressed and swung counterclockwise about the axis A to set the brake to its maximum extent (see FIG. 3). When the brake is fully set, a notch 55 in the sector 25 seats against a stop 56 on the bracket 15 to prevent further counterclockwise movement of the pedal and the sector.

Now assume that the brake is released by pulling the release rod 35. Upon release of the brake, the spring force in the cable 13 causes the pedal 20 and the sector 25 to turn rapidly about the axis A in the clockwise direction. During such turning, the cam surface 53 engages the roller 49 and turns the lever 47 counterclockwise about the axis B in order to wind the spring 40. The energy for winding the spring is derived from the flyback energy and thus that energy is reduced so as to cause the pedal to return to its brake-released position in a more gradual and softer manner than is the case with a conventional parking brake control. As a result, the impact of the pedal arm 21 against the stop bumper 24 is substantially reduced.

When the pedal arm 21 engages the stop bumper 24, the spring 40 is wound to its maximum extent. When the components are in this position, the roller 49 is disposed along the cam surface 53 in such a location that the line of force between the roller and the cam surface passes directly through the pivot axis A of the pedal and the sector 25 (see FIG. 1). As a result, the spring 40 —even though fully wound—does not apply any force to the pedal tending to turn the pedal counterclockwise toward its brake-applied position. Accordingly, the pedal is maintained in its full brake-released position by the force acting on and through the cable 13 and thus there is no danger of the spring 40 partially setting the brake. In other words, even though the force of the spring 40 tends to oppose the force exerted on the sector 25 by the cable 13, the cam surface 53 nullifies the spring force when the pedal is in its full brake-released position and makes the spring incapable of moving the pedal from that position. For all practical purposes, the spring acts against the sector 25 through a zero moment arm when the sector is fully released. Indeed, the cam surface could be shaped such that, as the pedal just approaches its fully released position, the spring assists in moving the pedal toward that position.

When the pedal 20 and the sector 25 are next rocked in a counterclockwise direction to set the brake, the cam surface 53 moves counterclockwise along the roller 49 and pivots the lever 47 clockwise to create a positive moment arm for the spring 40 to act against the cam surface (see FIG. 2). As a result, the spring biases the sector in the counterclockwise direction and reduces the manual effort required to be applied to the pedal 20. As the sector progresses in the counterclockwise direction, the spring 40 unwinds and exerts less force. Due to the shape of the cam surface, however, the length of the moment arm through which the spring acts progressively increases as the sector progressively moves counterclockwise as is apparent from a comparison of FIG. 2 with FIG. 3. By virtue thereof, the spring force is progressively amplified so that, even though the spring force itself progressively decays, the force which is actually exerted on the sector is kept at a high magnitude so that the sector may be moved counterclockwise through its full range with relatively low manual effort.

The spring 40 provides an additional advantage in a parking brake control 10 of the type disclosed herein in which the sector 25 is held in its brake-applied position by the wrap spring clutch 32. That is, the spring 40 opposes the force in the cable 13 tending to return the sector to its brake-released position. As a result, less force is required from the clutch to hold the sector in its brake-applied position and thus the torque requirements placed on the clutch are reduced. This increases the service life of the clutch or, alternatively, enables the use of a lighter duty clutch.

Those familiar with the art will appreciate that the principles of the invention may be used with various types of parking brake controls, for example, a control in which the sector 25 is held releasably in its brake-applied position by a pivotally mounted pawl. In controls having a hand-operated lever or a push-to-release foot-operated lever, the spring 40 will provide stored energy assist during application of the brake but does not provide any particular advantage during release of the brake since the levers of such controls are inherently released slowly.

It will also be appreciated that different types of springs such as extension springs or compression springs may be used in lieu of the torsion spring 40. Indeed, any elastic device such as a so-called gas spring capable of storing and releasing energy may serve as the spring means. Also, the spring force need not be applied directly to the sector. Such force may be applied to any member of the control 10 that moves between brake-released and brake-applied positions and is subjected either directly or indirectly to the force of the cable 13.

We claim:

1. Apparatus for applying and releasing a vehicular parking brake having an operating cable, said apparatus comprising a member connectable to said cable and manually movable to a brake-applied position to increase tension in said cable, means for holding said member in said brake-applied position and selectively releasable to enable said cable to move said member to a brake-released position, a cam surface rotatable with the member about a first axis, and spring means having a follower acting on said cam surface at a contact point and along a line of force substantially normal to the cam surface at the contact point, the spring means having a loaded condition corresponding to the brake-released position and an unloaded condition corresponding to the brake-applied position, the follower and the cam surface creating a variable radial distance between the first axis and the line of force at the contact point which varies from substantially zero in the brake-released position and progressively increases as said member is moved toward said brake-applied position to provide progressively increasing force amplification as the spring is unloaded and progressively decreasing force amplification as the spring is loaded.

2. Apparatus as defined in claim 1 wherein movement from the brake-released position toward the brake-applied position causes return of energy from the spring means to the cable with progressive force amplification to assist application of the brake as the spring means is unloaded, whereby the spring means is readied to receive energy upon the next brake-release operation.

3. Apparatus as defined in claim 1 in which said member is supported to turn between said brake-applied and brake-released positions about the first axis, a lever connected to said spring means and supported to turn about a second predetermined axis, said spring means urging said lever to turn in a predetermined direction about said second axis, the follower being affixed on said lever and biased against said cam surface by said spring means, said cam surface being shaped to cause the radial distance between said first axis and the line of force acting between the follower on said lever and said cam surface to progressively increase as said member is progressively moved from said brake-released position to said brake-applied position.

4. Apparatus as defined in claim 3 in which said follower on said lever comprises a roller rotatably supported on said lever to turn about a third axis extending parallel to said first and second axes.

5. Apparatus as defined in claim 1 wherein movement of said apparatus from the brake-applied to the brake-released position transfers energy from the brake to the spring means, with progressive reduction in the radial distance causing progressive decrease in force amplification until the brake-released position is reached at which the spring means can exert no force on the cam toward the brake-applied position.

6. Apparatus as defined in claim 5 wherein movement from the brake-released position toward the brake-applied position causes return of energy from the spring means to the cable with progressive force amplification to assist application of the brake as the spring means is unloaded, whereby the spring means is readied to receive energy upon the next brake-release operation.

7. Apparatus as defined in claim 1 in which the spring means is a spiral spring having an inner end thereof fixed with respect to said apparatus, and an outer end connected to the follower so that travel of the brake from the brake-applied to the brake-released position transfers energy from the brake into winding the spring.

8. Apparatus as defined in claim 7 in which the follower at the contact point with the cam in the brake-released position produces a line of force passing through the first axis, so that the spring applies no force toward the brake applied position until after initial movement of the member from said brake-released position.

* * * * *